July 25, 1961

A. ZOLLINGER 2,993,670

MOTOR OPERATED HANGER

Filed May 31, 1960

INVENTOR.
ALFRED ZOLLINGER
BY
David D. McKenney
ATTORNEY

July 25, 1961 A. ZOLLINGER 2,993,670
MOTOR OPERATED HANGER

Filed May 31, 1960 7 Sheets-Sheet 3

FIG. 7

INVENTOR.
ALFRED ZOLLINGER
BY David D. McKenney
ATTORNEY

INVENTOR.
ALFRED ZOLLINGER
BY David D. McKenney
ATTORNEY

INVENTOR.
ALFRED ZOLLINGER
BY David D. McKenney
ATTORNEY

FIG. 13

INVENTOR.
ALFRED ZOLLINGER
BY David D. McKenney
ATTORNEY

United States Patent Office 2,993,670
Patented July 25, 1961

2,993,670
MOTOR OPERATED HANGER

Alfred Zollinger, Providence, R.I., assignor to Grinnell Corporation, Providence, R.I., a corporation of Delaware
Filed May 31, 1960, Ser. No. 32,644
16 Claims. (Cl. 248—58)

This invention relates to improvements in motor operated hangers. More particularly it has to do with such a hanger or device in which the motor, the jack and the load sensitive unit with or without a switch unit for controlling the motor are arranged in a novel way with respect to each other and the fixed elevation supporting member (i.e. the member adapted to be secured to fixed structure) with the result that a more compact, serviceable and trouble-free device is provided than any that has been proposed heretofore.

This application is a continuation-in-part of my prior copending application Serial No. 756,248, filed August 20, 1958, for Motor Operated Constant Support Hanger, now abandoned.

It has been known for many years that loads such as pipe lines which are subject to vertical movement due to thermal expansion and contraction could be supported by motor operated hangers. However, it is believed that only very recently have such devices appeared on the market and very few have been put into use. One reason for this earlier lack of interest in motor operated hangers appears to be the fact that they employ electrical circuits, switches, and highly machined parts which, when compared with the components of the widely used constant support spring hangers, are more delicate and would require more servicing and maintenance. This factor will be better appreciated when it is understood that the expected life of a pipe line may be as much as twenty-five years and the hangers are likely to be located in places which are relatively inaccessible and where the atmosphere is in certain installations corrosive. The spring-type constant support hangers have met these conditions with great success over the past years because of their simplicity, rugged construction and minimum of machined surfaces. It is believed that the motor-operated hanger is beginning to be found acceptable and to go into service because the present invention permits its numerous advantages to be enjoyed without its being unduly large and without undue operating, servicing and maintenance problems.

Accordingly, it is an object of the present invention to provide a motor operated constant support hanger which is compact and relatively simple in construction, easy to assemble and repair and inexpensive to manufacture.

In general motor operated constant support hangers each employ a fixed elevation supporting member adapted to be secured to some fixed structure, a jack interposed between the supporting member and the load to be supported, a reversible motor to drive the jack and a load sensitive unit which actuates a switch unit to control the motor operation. The load sensitive unit is located at some point where the load can act upon it and measures changes in the force exerted by the load from a predetermined force value. When the change is in one direction, for example an increase in force due to cooling and contraction of the pipe line load, and reaches a certain magnitude a switch is operated in the switch unit to turn on the motor in a direction to operate the jack to lower the load with respect to the supporting member. The result of this lowering is that the force exerted by the load on the hanger decreases until the predetermined force value is again reached at which point another switch in the switch unit operates to turn off the motor. The load will then be supported with the same predetermined force but at the new elevation until continued pipe line contraction results in a repeat of the above, or until a heating up of the piping produces a decrease in force from the predetermined value in which case a different switch in the switch unit will operate to turn on the motor to lift the load in a manner similar to the lowering of the load described above.

The load sensitive unit generally includes some form of spring which deflects slightly with the changes in the force exerted by the load and in proportion to such changes. The movement resulting from the spring deflection is employed through an operating element to actuate the switch unit.

In the past it was proposed to locate this load sensitive unit between the jack and the load. The disadvantage of this is that the load sensitive unit and switch unit are then required to move through a distance equal to the movement of the load throughout its range of travel and this might be as much as ten inches in the case of some pipe lines, so that provision must be made for the movement of these units with respect to other parts of the device which do not move. For example, the load sensitive and switching units are relatively delicate devices and should be protected by a surrounding casing or the like. A hanger of undesirable overall length would result if a casing were provided which did not move with such movable units but which protected them in all positions within their range of movement. On the other hand if instead of a protective casing which did not move with these units a protective casing were provided which did move in unison with them the result would still be a device requiring an undesirable amount of head room because it would have to be installed in a location where other equipment would not prevent the load sensitive and switch units from moving to their lower positions in their range of movement.

In addition in all the prior proposals the electrical leads from the switch unit to the power supply always have to be long enough and flexible enough to allow for the above-mentioned movement of the load sensitive and switching units.

In accordance with one aspect of the present invention the load sensitive unit is interposed between the jack and the supporting member so that the "fixed" portion of the jack becomes movable by the amount of change in deflection of the load sensitive unit spring, and the motor is mounted on the supporting member. In such case the movement of the "fixed" portion of the jack presents a problem in the drive connection between the jack and motor. In the present invention this problem is overcome by permitting free movement of at least a portion of the motor drive with respect to the supporting member so that the movement of the "fixed" jack portion does not interfere with the motor's driving the jack.

Thus a more specific object of the invention is to provide a motor operated hanger in which the load sensitive unit is interposed between the jack and the supporting member and at least a portion of the motor drive connection moves with the movements of the jack member which the motor drives, which movements are caused by operation of the load sensitive unit.

Another object is to provide a hanger of the type described in which the entire motor drive connection and motor are carried by the driven jack member.

Another object is to provide a hanger of the type described in which the motor is mounted on the supporting member and has a flexible drive connection with the driven jack member.

Another object is to provide a hanger of the type described in which the motor is mounted on the supporting member and drives the driven jack member through a belt and pulley assembly.

Another object is to provide a hanger of the type described in which the load sensitve unit and jack are readily removed from the supporting member.

Other objects will appear hereinafter.

The accompanying drawings show and the specification describes preferred embodiments of the present invention. However, they are merely illustrative of the invention which is not intended to be limited to them.

Figure 1:
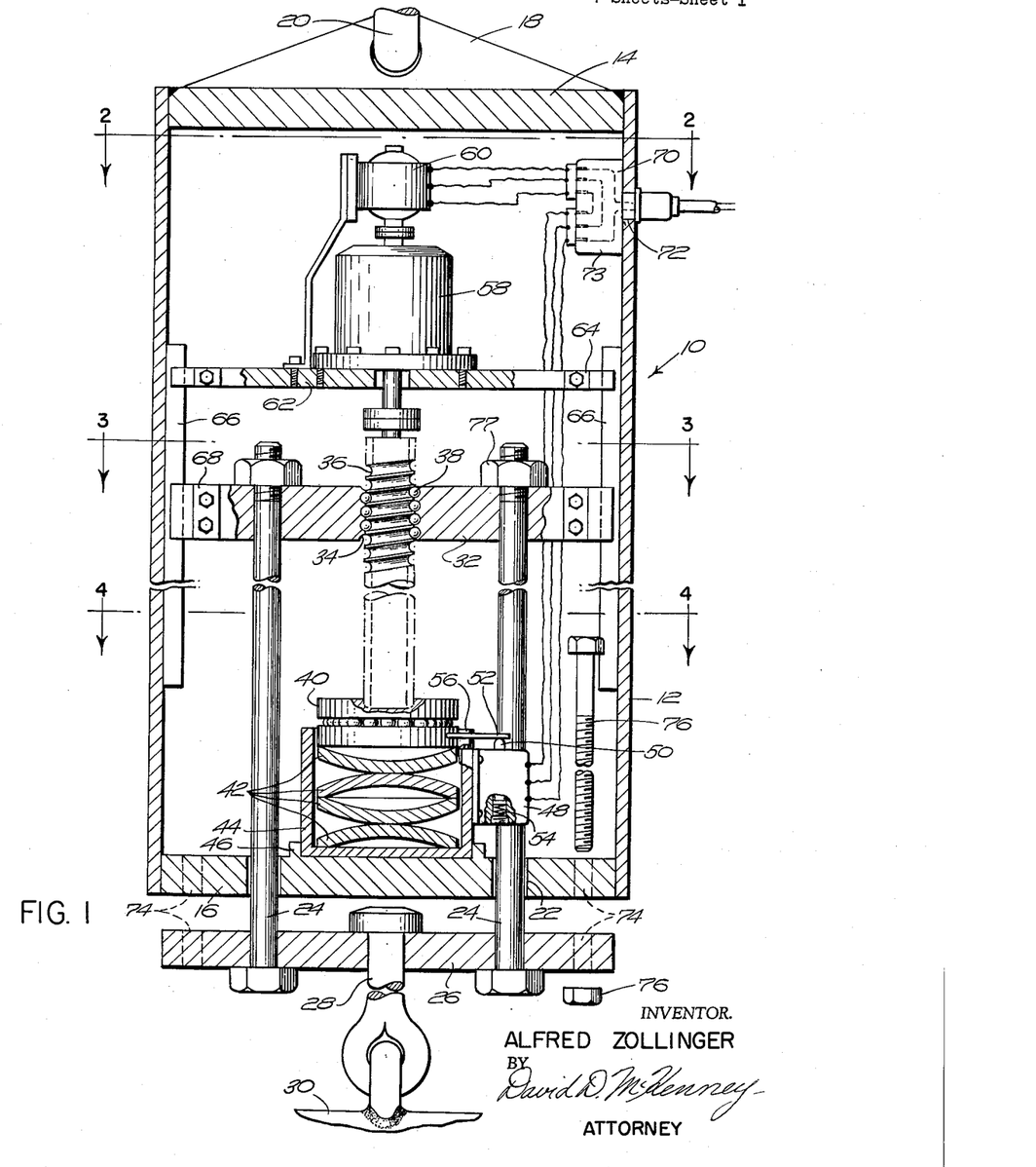
FIGURE 1 is a cross sectional side elevation view of one embodiment of the present invention.

Referring now more particularly to FIGURE 1 of the drawings, this embodiment has a supporting member 10 formed into a casing by side plates 12, a top plate 14 and bottom plate 16. The top plate is provided with one or more brackets 18 which are adapted to be engaged by the lower end of a suspension rod 20 the upper end of which (not shown) engages some fixed structure such as a building beam. The bottom plate 16 is provided with a pair of openings 22 through each of which a rod 24 slidably passes. The lower end of each of these rods 24 is connected to one portion of a cross-bar 26, and a single rod 28 having its upper end connected to the center of the cross-bar has its lower end connected to the load 30 which is shown as a horizontal section of piping in a piping system.

The upper end of each of the rods 24 is connected to the end of the nut member 32 of a screw jack. This nut member has a threaded opening 34 at its center which receives the screw member 36 of the jack. To minimize friction it is preferred that this screw and nut engagement employ ball bearings 38 in the manner which is well known in the machine arts and which is therefore shown only diagrammatically here. The screw member is arranged generally axially with respect to the supporting member 10 and rods 24 and has its lower end resting on a thrust bearing 40 which is capable of allowing the screw member to turn freely when the load to be supported is carried on the nut member through the rods 24, cross bar 26 and rod 28. The thrust bearing in turn rests on the top of a series of nested disc springs 42 which are held in alignment by a housing 44 which is in turn resting on the top of the bottom plate 16 and is maintained in alignment thereon by a lip 46 integrally formed on the bottom plate.

The spring housing 44 has mounted on its side a switch box 48 containing an armature the end 50 of which is shown projecting from the upper end of the box and also containing four switches (not shown) the operation of which will be explained later herein. The armature 50 is moved with respect to the switch box, housing and supporting member as the force exerted by the load changes by a lever arm 52 here shown secured to the thrust bearing for convenience. The armature is urged upwardly against the lever arm 52 by a light spring 54 in the switch housing. A cut out 56 in the side of the housing 44 accommodates the lever arm 52 and permits movement of this arm with deflection of the springs.

The upper end of the screw member 36 is coupled to and carries a speed reducing gear unit 58 which in turn is coupled to and driven by a motor 60. Both the speed reducing unit and motor are fastened to a plate 62, but this plate merely serves to prevent rotation of the speed reducing unit and motor with respect to the supporting member around the axis of the screw member. Thus the edge of the plate 62 carries at intervals brackets 64 which are secured to the plate and embrace longitudinal guide bars 66 mounted on the inner surface of the side plates 12. By this arrangement the motor and speed reducing unit are prevented from rotating as mentioned but are free to move up and down slightly as the changes in load change the deflection of the springs 42 and hence the vertical position of the parts resting on these springs.

In a similar manner the nut member 32 is prevented from rotating with the rotating screw member by brackets 68 which embrace the same guide bars 66. It will be noted, however, that while the vertical movements of the plate 62 will be quite small those of the nut member may be very large since the nut member carries and moves with the load.

The electrical leads 70 from a source of power (not shown) pass through the side plates 12 by an opening 72 and are connected to a junction box 73 from which other leads extend to the motor 60 and switch box 48. It is one feature of the present invention that the load sensitive unit does not have to move through the entire range of travel of the load.

Another feature of the invention is that the electrical leads to the switch box do not need to be flexible enough to move with the load because of the location of the switch box and load sensitive spring unit which operates it between the jack and the supporting member.

Figure 2:
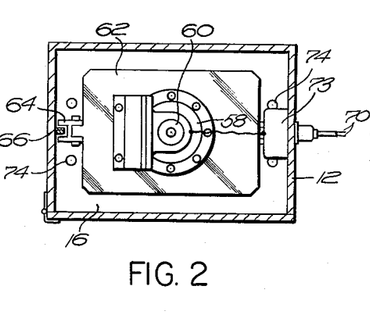
FIGURE 2 is a cross section plan view taken on line 2—2 of FIGURE 1.
Figure 3:
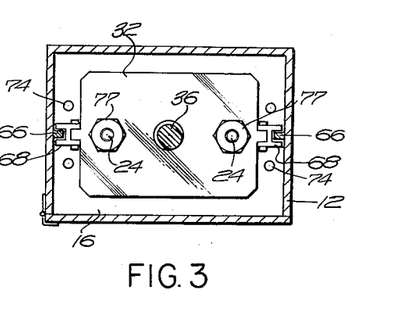
FIGURE 3 is a cross section plan view taken on line 3—3 of FIGURE 1.
Figure 4:
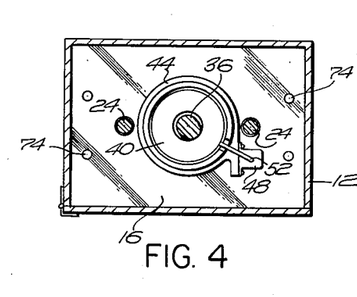
FIGURE 4 is a cross section plan view taken on line 4—4 of FIGURE 1.

Another feature of the invention is that the vertical movement of the screw member of the jack due to the change in deflection of the spring unit does not interfere with the driving of this screw member by the motor. In this embodiment of FIGURE 1 the last mentioned feature is realized by mounting the entire motor 60 and speed reducing unit 58 directly on the screw member. One result of this latter arrangement is that the hanger is very easily serviced because the motor, speed reducing unit, jack, spring unit and switch box may be removed from the supporting member as a single subassembly and a new subassembly put in its place while the first is being repaired. Thus the bottom plate 16 and cross-bar 26 are provided with a number of aligned openings 74 adapted to receive bolt and nut assemblies 76 which can temporarily hold the cross-bar fixed with respect to the supporting member at the particular position which the load assumed in its vertical range of movement when the hanger became inoperative. Next the nuts 77 which serve to secure the rods 24 to the nut member 32 are removed and the rods 24 withdrawn. Then the brackets 64 and 68 are removed from the plate 62 and nut member 32, respectively, the electrical leads from the junction box are disconnected, and then the motor 60, speed reducing unit 58, plate 62, jack, thrust bearing 40, spring unit and switch box 48 are removed from the supporting member as a subassembly. For convenience a door is provided on one side of the supporting member to facilitate such removal. See FIGURE 2.

The operation of this described embodiment is as follows. If during operation of the piping system the pipe section 30 is pulled down by thermal movement of other portions of the system the result is an apparent increase in the weight of the section 30. Since the springs 42 are initially deflected an amount corresponding to the weight of the section before the above mentioned movement the apparent additional weight further deflects these springs, and when this further deflection reaches a predetermined value, for example the initial weight plus 2% of the initial weight, a switch in the switch box 48 closes and turns on the motor 60 which drives the speed reducing unit 58 and screw member 36 to move the nut member down. This lowers the load and begins to reduce the apparent increase in weight previously mentioned, and when the deflection of the springs indicates that the initial weight is again being supported a second switch in the switch box is operated by the armature 50 to turn off the motor. The hanger components then remain in this new position until there is another movement of the load. If this next movement is upwardly the operation is similar except that the motor is turned on by a third switch to lift the load and restore the initial weight. When the motor is not operating the pitch of the threads of the screw member is sufficiently small to prevent rotation of the screw due to weight acting on the nut.

Figure 5:
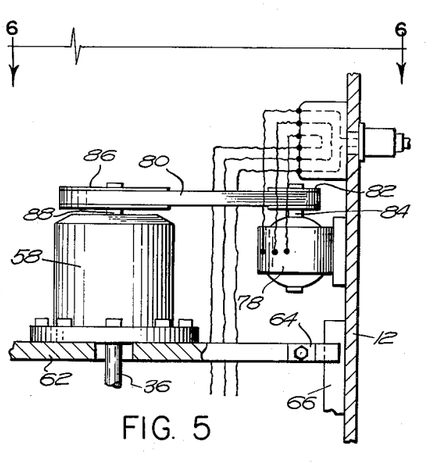
FIGURE 5 is a fragmentary cross section elevation view of another arrangement for the upper end of the device shown in FIGURE 1.
Figure 6:
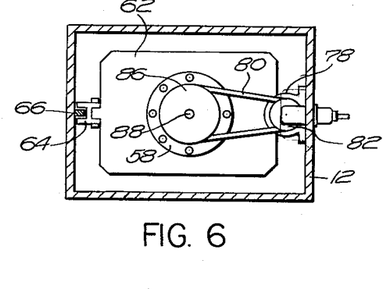
FIGURE 6 is a cross section plan view taken on line 6—6 of FIGURE 5.

Referring now to FIGURE 5, this shows another arrangement. The hanger is the same as that of FIGURES 1 to 4 except that the motor 78 is mounted on the supporting member for example on the side plate 12. However, because of the movement of the screw member 36 with changes in deflection in the springs it is necessary in this arrangement to make sure that the drive between the motor 78 and speed reducing unit 58 is not disrupted by this movement. In FIGURE 5 such movement is allowed for by employing a belt 80 and pulley drive, one pulley 82 being on the motor shaft 84 and another pulley 86 being on the input shaft 88 of the speed reducing unit. The pulley 86 can move vertically an appreciable amount with respect to pulley 82 without disrupting its function of driving the jack. In the embodiment of FIGURES 1 to 4 the drive is not disrupted because the entire motor moves with the changes in deflection of the springs 42.

Figure 7:
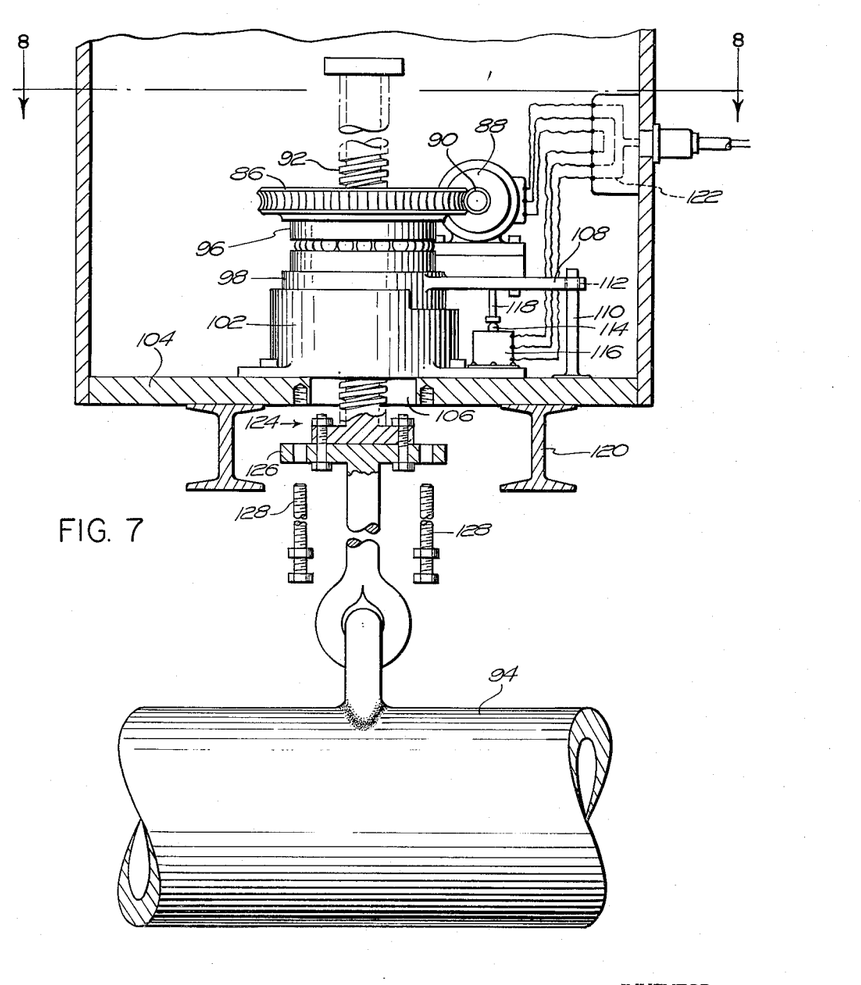
FIGURE 7 is a partially cross sectioned elevation view of another embodiment of the invention.
Figure 8:
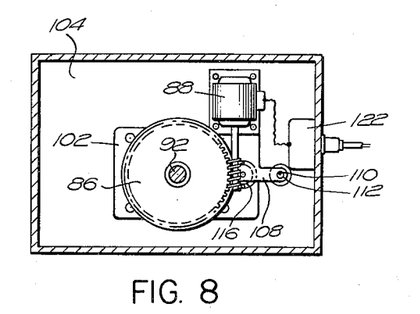
FIGURE 8 is a plan view taken on line 8—8 of FIGURE 7.
Figure 9:
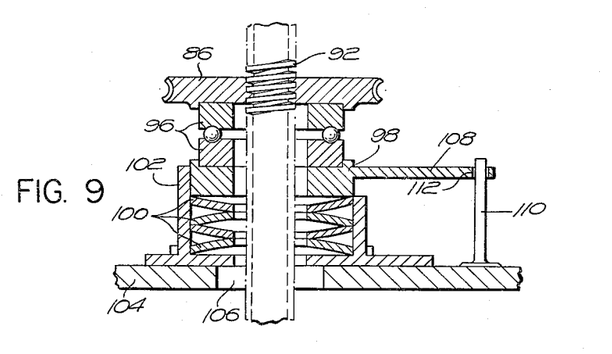
FIGURE 9 is a cross section elevation view of a portion of the device of FIGURE 7.

FIGURES 7 to 9 show another embodiment of the invention in which the nut member 86 is in the form of a worm wheel driven by a motor 88 through a worm gear 90. The rotation of the worm wheel feeds the non-rotating screw member 92 up and down depending on the direction of rotation of the reversible motor. The load 94 is connected to the lower end of the screw member. The worm wheel 86 is supported on an annular thrust bearing 96 which is in turn supported on the top cap 98 of an annular nest of disc springs 100. These springs and the top cap 98 are held in proper vertical alignment by a housing 102 which rests upon a supporting member 104 with an aperture 106 to accommodate the screw member. Because the worm wheel 86 moves vertically with changes in the deflection of the nested springs 100 the motor 88 is mounted on an extension 108 of the spring unit top cap 98 so that the worm wheel and worm gear move in unison and this drive is not disrupted by the changes in load. A guide post 110 slidably received in an aperture 112 in the extension 108 prevents rotation of the top cap and motor thereon while permitting vertical movement of this top cap.

The extension 108 also serves as a lever for actuation of the armature 114 of a switch box 116, there being a plunger 118 secured to and depending from the underside of the extension in engagement and alignment with the armature.

The supporting member 104 may be suitably carried on I-beams 120, and electrical leads 122 bring power to a junction box and then to the motor and switch box.

For convenience in servicing the switch box 116 is mounted on the spring unit housing 102 and a coupling 124 is provided on the lower end of the screw member. Thus by temporarily securing the lower part 126 of the coupling to the supporting member by separate bolts 128, by undoing the coupling and by loosening the bolts holding the housing 102 on the supporting member the screw member, spring unit, switch box, thrust bearing, worm wheel and motor may be removed as a subassembly and quickly replaced by another.

Figure 10:
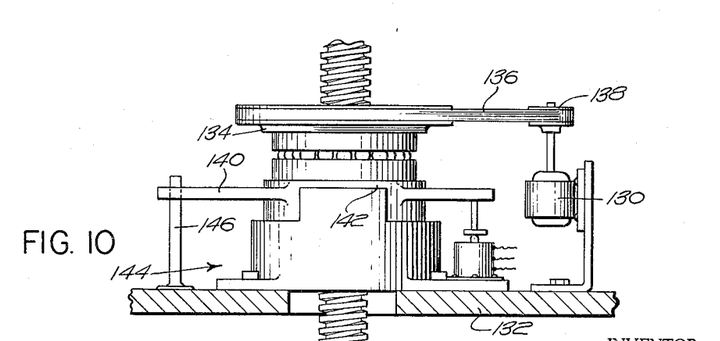
FIGURE 10 is a side elevation view of another embodiment similar to that of FIGURE 7.

In FIGURE 10 the motor 130 is mounted directly on the supporting member 132 and drives the nut member 134 of the jack through a belt 136 which can tolerate the changes in vertical position of the nut member with respect to the motor pulley 138 without disrupting the drive. An extension 140 on the top cap 142 of the spring unit 144 is again employed with a guide post 146 to prevent rotation of this top cap.

Figure 11:
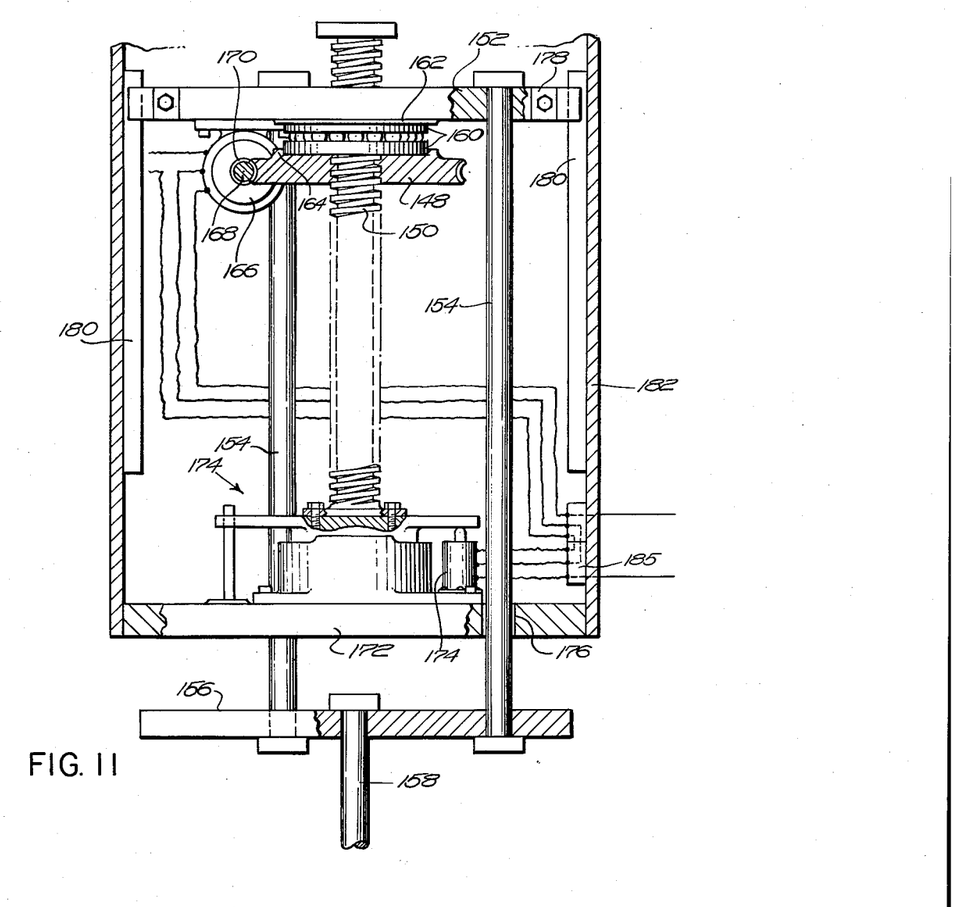
FIGURE 11 is a side elevation view partly cross sectioned of another embodiment of the invention.

FIGURE 11 shows another arrangement in which the nut member 148 in the form of a worm wheel both rotates and moves vertically while the screw member 150 neither rotates nor moves axially with the large load movements. The load is supported by a plate 152 by rods 154 the upper ends of which are connected to the ends of the plate and the lower ends of which are connected to the ends of a cross bar 156. The load is connected to the center of this cross bar by a rod 158. Since the worm wheel 148 rotates while the plate 152 does not a thrust bearing 160 is located between these parts surrounding the screw member and held in proper alignment by lips 162 and 164 on the plate and nut member, respectively. A motor 166 is mounted on the plate 152 and has its drive shaft 168 provided with a worm gear 170.

There is no relative movement between the plate 152 and worm wheel 148, and accordingly the changes in load do not disrupt the driving of the worm wheel by the motor. The load sensitive unit in this embodiment comprises the same arrangement of nested springs as in the previous figures and transmits the weight of the load to a supporting member 172. This load sensitive unit is generally designated by the numeral 174. Although rotation of the plate 152 would be prevented by the rods 154 passing the openings 176 in the supporting member 172 the length of these rods justifies a guide bracket 178 secured to the edge of plate 152 and embracing a track 180 mounted on the inside surface of a supporting member side plate 182.

Electrical leads 184 lead from a source of power to a junction box 185 and then to the motor and switch box. In this case the leads from the junction box to the motor must be flexible because the motor moves with the load, but the leads to the switch box need not be flexible because the switch box is immovable with respect to the supporting member.

Figure 12:
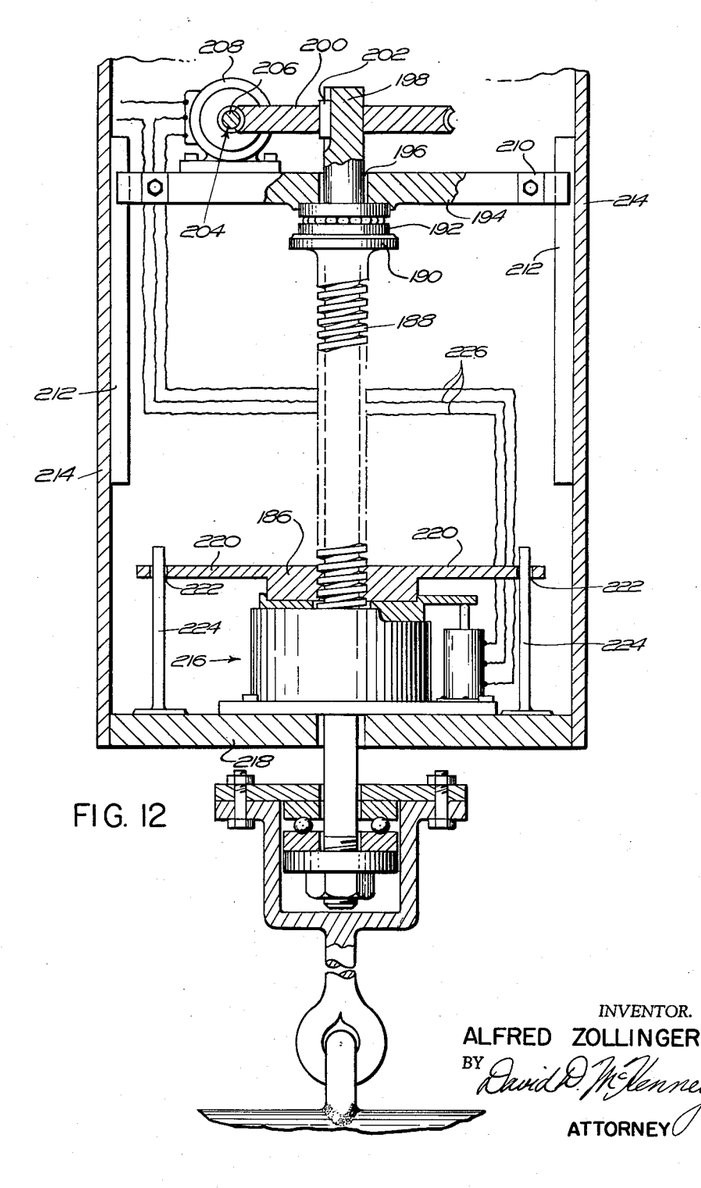
FIGURE 12 is a side elevation view partly cross sectioned of another embodiment.

In FIGURE 12 the nut member 186 is both non-rotating and prevented from moving vertically appreciably while the screw member 188 both rotates and moves vertically in the nut member. Thus the top of the screw member is provided with a shoulder 190 on which an annular thrust bearing 192 rests. In turn a plate 194 rests on the thrust bearing and has an aperture 196 through which a portion 198 of the screw member above the shoulder projects. This portion has a worm wheel 200 secured to it by a key 202, and this worm wheel is driven by a worm gear 204 on the shaft 206 of a motor 208 mounted on the plate 194. This plate is prevented from rotating by guide brackets 210 carried on its edge and embracing a track 212 secured to the inner surface of a supporting member side plate 214.

The nut member 186 rests upon a load sensitive switch unit generally designated by the numeral 216 and similar to those previously described. This unit in turn rests upon and is secured to a supporting member plate 218. Extensions 220 on the nut member are apertured at 222 to slidably receive posts 224 fixed to the plate 218 so that rotation of the nut member is prevented while still allowing the slight vertical movements from changes in spring deflection with changes in load. The load sensitive unit is of the annular type to permit free movement of the screw member through it.

Electrical leads 226 bring power to the hanger from a power source.

Figure 13:
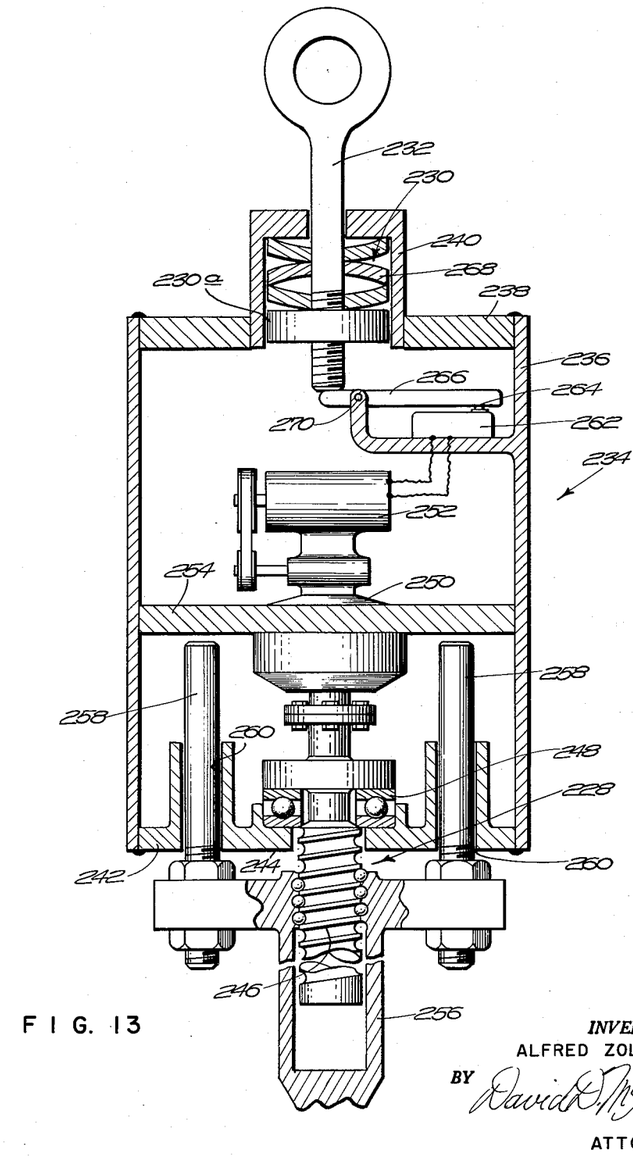
FIGURE 13 is a side elevation partly cross sectioned view of still another embodiment.

In FIGURE 13 the jack 228 is hung from the load sensitive unit 230 which is mounted on the supporting member 232. Thus, in this embodiment the supporting member 232 is in the form of an eye bolt having the base 230a of the load sensitive unit 230 resting thereon by a threaded engagement, and considerable structure 234 is required to hang the jack from the movable part of the load sensitive unit 230, as distinguished from the earlier figures in which the jack rests directly on this movable part.

This structure 234 is generally in the form of a casing 236 with a top plate 238 secured to the movable part 240 of the load sensitive unit and with a bottom plate 242 having a central aperture 244 receiving the upper end of screw 246 rotationally mounted on this bottom plate by a ball bearing 248. This end of the screw also carries within the casing 236 a speed reducing unit 250 and motor 252 which are additionally braced by a cross piece 254 secured to the casing 236.

A jack nut 256 is threaded on the jack screw 246 and has its lower end (not shown) adapted to be connected to a load. In addition this jack nut is provided with guide rods 258 which are slidable in additional apertures 260 in the casing bottom plate 242. These rods prevent rotation of the jack nut 256 with respect to the jack screw 246 when the latter is rotated by the motor.

This motor is controlled by switches in a switch box 262 mounted on the casing 236, which switches are actuated by an armature 264 moved by a lever 266. The deflection of the springs 268 in the load sensitive unit caused by changes in the force exerted by the load produce rotation of the lever 266 which engages the end of the supporting member 232 and is pivoted on the casing 236 at 270. This moves the armature and actuates the switches in the same manner described in connection with the earlier embodiments.

From the foregoing it will be apparent that in the several described arrangements of jacks for motor operated hangers in accordance with the present invention devices which require large headroom are avoided and undesirable movement of the load sensitive unit with the full travel of the load may be avoided by locating this unit between the portion of the jack which does not move vertically with the full movement of the load and the supporting member and it will be further apparent that in the arrangements where the change in deflection of the spring unit with changes in load would disrupt the driving of the jack by the motor, the drive components can be arranged so that this does not happen by allowing at least some of these components to move freely.

I claim:

1. A motor operated hanger for supporting a load subject to movement within a limited range of movement comprising a supporting member adapted to be secured to fixed structure, a movable member movable with respect to said supporting member and adapted to be secured to said load, a jack connected to said supporting member and to said movable member, said jack when actuated moving said movable member with respect to said supporting member, a motor, means connecting said motor to said jack, said motor when turned on actuating said jack through said connecting means, means for sensing changes in said load and for actuating said motor in response to said changes, said sensing means being located between said jack and said supporting member and having a portion movable with respect to said supporting member with changes in load in a substantially straight line, a portion of said jack engaging said movable portion and causing movement thereof with changes in the load, said connecting means connecting said motor to said jack having at least a portion movable with the movement of said movable sensing means portion.

2. A motor operated hanger for supporting a load subject to vertical movement within a limited range of movement comprising a supporting member adapted to be secured to fixed structure, a member movable with respect to said supporting member, means for securing said movable member to the load, means for exerting a force on said movable member to move said movable member with respect to said supporting member, said last mentioned means including a motor, a jack and means for connecting said motor to said jack to actuate said jack, a loading sensitive member located between said force exerting means and said supporting member for sensing changes in said load, said load sensitive member having a portion movable with respect to said supporting member, a portion of said jack engaging said movable portion and causing movement thereof in response to changes in the load, said movable portion actuating said motor in response to said changes, said connecting means having at least the portion thereof engaging said jack freely movable with the movement of said load sensitive member portion with respect to said supporting member.

3. A motor operated hanger for supporting a load subject to vertical movement with respect to fixed structure within a limited range of movement comprising a supporting member adapted to be secured to said fixed structure, a member movable with respect to said supporting member along a line of movement, means for securing said movable member to the load, means for exerting a force on said movable member to move said movable member with respect to said supporting member, said last mentioned means including a motor, a jack and a drive mechanism having a part engaging said motor and a part engaging said jack and connecting said motor to said jack to actuate said jack, a load change sensitive member located between said force exerting means and said supporting member for sensing changes in said load, said sensitive member transmitting to said supporting member at least a portion of said load and having a part movable with respect to said supporting member, a portion of said jack engaging said movable portion and causing movement thereof in response to changes in the magnitude of said load, said movable portion actuating said motor in response to said changes, said drive mechanism having at least the said part thereof which engages said jack freely movable with the movement of the jack with respect to said supporting member due to movement of said sensitive member part with respect to said supporting member with changes in the magnitude of the load.

4. A motor operated hanger for supporting a load subject to movement which is substantially vertical with respect to fixed structure within a first limited range of movement comprising a supporting member adapted to be secured to said fixed structure, a member movable with respect to said supporting member along a line of movement, means for securing said movable member to the load with said line of movement substantially vertical, means for exerting a force on said movable member to move said movable member along said line of movement, said last mentioned means including a motor, a jack, and a drive mechanism engaging said motor and said jack and connecting said motor to said jack to actuate said jack by said motor, a load change sensitive member located between said force exerting means and said supporting member for sensing changes in said load, said sensitive member transmitting to said supporting member at least a portion of said load and having a part movable vertically with respect to said supporting member, a portion of said jack engaging said movable portion and causing movement thereof in response to changes in the magnitude of said load within a second limited range substantially smaller than said first range, said movable portion actuating said motor in response to said changes, said drive mechanism having at least the said part thereof which engages said jack freely movable with the jack through a range of movement with respect to said supporting member which corresponds in direction and magnitude to said second range.

5. A motor operated hanger for supporting a load subject to vertical movement within a limited range of movement comprising a supporting member adapted to be secured to fixed structure, a load sensitive unit having a base resting on said supporting member and a member movable with respect to said base with changes in force exerted thereon, a jack having a first part mounted on said load sensitive unit's movable member and having a second part movable with respect to said first part, means for connecting said second jack part to said load, a motor, a motor drive connecting said motor to one of said jack parts and moving the jack part connected to said load relative to the jack part mounted on said load sensitive unit's movable member, said motor drive having at least its connection with the said one jack part movable with said load sensitive unit's movable member.

6. A hanger according to claim 1 wherein said jack comprises a screw member mounted on said sensing means and movable therewith with changes in load and a nut member mounted on said movable member and in threaded engagement with said screw member, wherein said motor and connecting means rotate one of said jack members when said motor is operating, and wherein said motor and connecting means are fixed against movement along said straight line with respect to the jack member rotated.

7. A hanger according to claim 1 wherein said jack comprises a nut member mounted on said sensing means and movable therewith with changes in load and a screw member secured to said movable member and in the threaded engagement with said nut member, wherein said motor and connecting means rotate one of said jack members when said motor is operating, and wherein said motor and connecting means are fixed against movement along said straight line with respect to the jack member rotated.

8. A hanger according to claim 6 wherein said motor and connecting means rotate said screw member and wherein there are means fixing said motor and connecting means against movement along said straight line with respect to said screw member.

9. A hanger according to claim 6 wherein said motor and connecting means rotate said nut member and wherein there are means fixing said motor and connecting means against movement along said straight line with respect to said nut member.

10. A hanger according to claim 7 wherein said motor and connecting means rotate said screw member and wherein there are means fixing said motor and connecting means against movement along said straight line with respect to said screw member.

11. A hanger according to claim 7 wherein said motor and connecting means rotate said nut member and wherein there are means fixing said motor and connecting means against movement along said straight line with respect to said nut member.

12. A motor operated hanger for supporting a load subject to vertical movement within a limited range of movement comprising a supporting member adapted to be secured to fixed structure, a load sensitive unit having a base fixed to said supporting member and a member movable with respect to said base in a substantially straight line with changes in force exerted thereon along said line, a load carrying member movable with respect to said supporting member along a line of movement, means for connecting said load carrying member to the load, a jack comprising a screw member and a nut member in threaded engagement with said screw member, means for mounting one of said jack members on said sensitive unit movable member, means for connecting the other of said jack means to said load carrying member, whereby both jack members move along said substantially straight line in unison with said sensitive unit movable member during load changes, a motor, a motor drive connecting said motor to one of said jack members to rotate said jack member, said motor drive including a speed reducing mechanism having at least a portion thereof fixed against movement along said straight line of movement with respect to said rotated jack member.

13. A motor operated hanger according to claim 12 wherein said screw member has one end mounted on said sensitive unit movable member with the longitudinal axis of said screw member substantially parallel to said straight line of movement of said sensitive unit movable member, wherein said load carrying means is connected to said nut member and has its said line of movement in a substantially straight line substantially parallel to the said longitudinal axis of said screw member, and wherein said speed reducing mechanism portion engages the other end of said screw member.

14. A motor operated hanger according to claim 13 wherein said motor drive and speed reducing mechanism are fixed against movement along said straight line of movement with respect to said rotated screw member.

15. A motor operated hanger according to claim 13 wherein said motor, motor drive and speed reducing mechanism are fixed against movement along said straight line of movement with respect to said rotated screw member.

16. A motor operated hanger for supporting a load subject to vertical movement within a limited range of movement comprising a supporting member having an axis; means for securing said supporting member to fixed structure with said axis substantially vertical; a load sensitive unit having a base fixed to said supporting member, having a member movable with respect to said base along a line of movement substantially parallel to said axis, and having a spring between said base and movable member; a jack comprising a screw member having one end mounted on said sensitive unit movable member and having its longitudinal axis substantially parallel to said supporting member axis; said jack further comprising a nut member threadedly engaged on said screw member and movable therealong in a line of movement substantially parallel to said supporting member axis when said screw member is rotated with respect to said supporting member and said nut member is restrained against rotation with respect to said supporting member; means for connecting said nut member to the load; whereby the weight of the load is transmitted through said means to said nut member to said screw member to said load sensitive unit to said supporting member to the fixed structure when the hanger is installed; a motor, motor drive and speed reducing mechanism mounted on the other end of said screw member and rotating said screw member when said motor is turned on; said motor, motor drive and speed reducing mechanism being movable with said screw member and with respect to said supporting member along said supporting member axis with changes in load; means for guiding the movement of said nut member, motor, motor drive and speed reducing mechanism along a line substantially parallel to said axis.

No references cited.